United States Patent
Yasukawa et al.

(10) Patent No.: US 10,390,339 B2
(45) Date of Patent: Aug. 20, 2019

(54) USER APPARATUS, AND CONTROL CHANNEL RECEPTION METHOD

(71) Applicant: NTT DOCOMO, INC., Tokyo (JP)

(72) Inventors: Shimpei Yasukawa, Tokyo (JP); Satoshi Nagata, Tokyo (JP); Qin Mu, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 37 days.

(21) Appl. No.: 15/513,521

(22) PCT Filed: Sep. 18, 2015

(86) PCT No.: PCT/JP2015/076746
§ 371 (c)(1),
(2) Date: Mar. 22, 2017

(87) PCT Pub. No.: WO2016/047618
PCT Pub. Date: Mar. 31, 2016

(65) Prior Publication Data
US 2017/0303247 A1    Oct. 19, 2017

(30) Foreign Application Priority Data
Sep. 25, 2014  (JP) ................................. 2014-195884

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0053* (2013.01); *H04L 5/0094* (2013.01); *H04W 72/1289* (2013.01); *H04W 88/02* (2013.01)

(58) Field of Classification Search
CPC ... H04W 72/042; H04L 5/0053; H04L 5/0094
See application file for complete search history.

(56) References Cited

U.S. PATENT DOCUMENTS

| | | | |
|---|---|---|---|
| 2012/0327894 A1* | 12/2012 | Axmon | H04W 72/04 |
| 2014/0177556 A1* | 6/2014 | Pan | H04L 5/0053 |
| | | | 370/329 |

(Continued)

FOREIGN PATENT DOCUMENTS

| | | |
|---|---|---|
| EP | 2632077 A2 | 8/2013 |
| JP | 2013-243460 A | 12/2013 |

(Continued)

OTHER PUBLICATIONS

Office Action issued in corresponding Japanese Application No. 2016-550317, dated Feb. 6, 2018 (5 pages).

(Continued)

*Primary Examiner* — Ronald B Abelson
(74) *Attorney, Agent, or Firm* — Osha Liang LLP

(57) ABSTRACT

A user apparatus configured to perform communication with a base station in a mobile communication system, wherein a common search space and a user specific search space are multiplexed in a predetermined physical downlink control channel transmitted from the base station, the user apparatus including: a monitoring control unit configured to monitor, for each predetermined time frame, any one of the common search space and the user specific search space in the predetermined physical downlink control channel in order to obtain downlink control information.

10 Claims, 15 Drawing Sheets

(51) Int. Cl.
*H04W 88/02* (2009.01)
*H04W 72/12* (2009.01)

(56) References Cited

U.S. PATENT DOCUMENTS

| | | |
|---|---|---|
| 2014/0293942 A1 | 10/2014 | Kang et al. |
| 2015/0043355 A1 | 2/2015 | Kim et al. |
| 2016/0127952 A1* | 5/2016 | You .................. H04W 28/20 |

FOREIGN PATENT DOCUMENTS

| | | |
|---|---|---|
| WO | 2013055143 A2 | 4/2013 |
| WO | 2013151389 A1 | 10/2013 |

OTHER PUBLICATIONS

International Search Report issued in PCT/JP2015/076746 dated Nov. 17, 2015 (5 pages).
Written Opinion of the International Searching Authority issued in PCT/JP2015/076746 dated Nov. 17, 2015 (4 pages).
3GPP TS 23.682 V11.5.0; "3rd Generation Partnership Project; Technical Specification Group Services and System Aspects; Architecture enhancements to facilitate communications with packet data networks and applications (Release 11)"; Sep. 2013 (29 pages).
3GPP TR 36.888 V12.0.0; "3rd Generation Partnership Project; Technical Specification Group Radio Access Network; Study on provision of low-cost Machine-Type Communications (MTC) User Equipments (UEs) based on LTE (Release 12)"; Jun. 2013 (55 pages).
3GPP TSG RAN WG1 Meeting #78bis; R1-144147; NTT DOCOMO; "Design of EPDCCH Search Space for low cost MTC"; Ljubljana, Slovenia; Oct. 6-10, 2014 (4 pages).
Office Action issued in corresponding Japanese Patent Application No. 2016-550317, dated Sep. 5, 2017 (5 pages).
Extended European Search Report issued in corresponding European Patent Application No. 15843680.8, dated Sep. 20, 2017 (7 pages).
Office Action issued in the corresponding Chilean Patent Application No. 201700698, dated Jun. 14, 2018 (11 pages).
Office Action issued in the counterpart European Patent Application No. 15843680.8, dated Aug. 3, 2018 (8 pages).

* cited by examiner ical field

USER APPARATUS, AND CONTROL CHANNEL RECEPTION METHOD

TECHNICAL FIELD

The present invention relates to a technique for a user apparatus in a mobile communication system to receive downlink control information transmitted from a base station.

BACKGROUND ART

In recent years, study of M2M (Machine-to-Machine) communication is progressing in which communication is executed between machines that are connected to a communication network without operation by a human so that proper control of machines and the like are automatically performed. For example, in 3GPP, standardization is progressing as a name of MTC (Machine Type Communication) (non-patent document 1, for example).

In M2M, since a huge number of MTC UEs (user apparatuses for MTC) are assumed to be introduced, it is important to reduce the cost of the MTC UE, and study for it is progressing (for example, non-patent document 2). An MTC UE of low cost is referred to as a Low-cost MTC UE. This is described as LC MTC UE hereinafter.

RELATED ART DOCUMENT

Non Patent Document

[NON PATENT DOCUMENT 1] 3GPP TS 23.682 v11.5.0
[NON PATENT DOCUMENT 2] 3GPP TR 36.888 V12.0.0

SUMMARY OF THE INVENTION

Problem to be Solved by the Invention

As one of methods for reducing cost of the MTC UE, it is assumed to restrict a bandwidth of DL/UL for the UE.

However, if the bandwidth of a signal that the UE can receive is restricted, there is a problem in that a PDCCH (Physical Downlink. Control CHannel) that is transmitted by the whole system band cannot be received.

On the other hand, an EPDCCH (enhanced PDCCH) introduced from Rel-11 can be frequency-multiplexed with PDSCH in units of PRBs (physical resource blocks). Thus, by properly setting a bandwidth, the EPDCCH can be received by a UE for which the bandwidth is restricted. However, the EPDCCH is a channel that is US-specific and that transmits a UE-specific DCI (downlink control information) such as scheduling information and the like of a signal for the UE as shown in FIG. 1. This, if this goes on, the UE cannot receive a common DCI (common DCI) transmitted by a CSS (common search space) of a PDCCH.

Thus, it is being considered to support CSS in the EPDCCH and to receive a common DCI by the EPDCCH. The EPDCCH mentioned here indicates transmission of downlink control information using a time • frequency region of a PDSCH (that is a region different from the PDCCH), and is not necessarily the same as the EPDCCH introduced in Rel-11.

Here, a description of the CSS and the USS (UE specific search space) is given. For a UE to decide a DCI by blind searching, the US is configured with a search area that is called a search space in a (E)PDCCH for reducing the number of times of search. In the search spaces, a predetermined area commonly searched by each UE is the CSS, and an area individually searched by each UE is the USS. An area to which the USS is assigned is uniquely determined for each UE by a subframe number, UE-ID and the like, for example.

When the CSS is supported in the EPDCCH, as information to be transmitted by the CSS, there are a DCI of RAR (random access response), a DCI of paging, and a DCI of system information (SIB (System Information Block)1, SIB2 and so on)) in a case where PDCCH based scheduling is performed.

When scheduling is performed by using an EPDCCH for a UE in which bandwidth is restricted, scheduling between subframes (cross-subframe scheduling) is performed as shown in FIG. 2A. Therefore, in order to reduce blocking probability to bring flexibility to assignment, it can be considered to place the CSS and the USS in resources separated in the frequency direction in the EPDCCH as shown in FIG. 2B.

However, in a case where the CSS and the USS are multiplexed to a range exceeding a restricted bandwidth of the LC MTC UE, the LC MTC UE cannot receive the CSS and the USS at the same time as shown in FIG. 3. That is, the UE can perform demodulation and blind decoding only for a signal of one search space. If the UE cannot receive the CSS and the USS at the same time, there is a problem in that delay occurs for obtaining information of a DCI mapped to each search space, and that failure of operation may occur because of inability to receive a signal that should be received at a predetermined timing. Also in a case where the CSS and the USS are not separated in the frequency direction, there is a problem in that capacity lack and delay of control information occur.

The present invention is contrived in view of the above-mentioned points, and an object of the present invention is to provide a technique for making it possible that even a user apparatus in which a bandwidth is restricted properly obtains downlink control information in a case where a plurality of search spaces are multiplexed in a predetermined physical downlink control channel.

Means for Solving the Problem

According to an embodiment of the present invention, there is provided a user apparatus configured to perform communication with a base station in a mobile communication system, wherein a common search space and a user specific search space are multiplexed in a predetermined physical downlink control channel transmitted from the base station, the user apparatus including:

a monitoring control unit configured to monitor, for each predetermined time frame, any one of the common search space and the user specific search space in the predetermined physical downlink control channel in order to obtain downlink control information.

According to an embodiment of the present invention, there is provided a control channel reception method executed by a user apparatus configured to perform communication with a base station in a mobile communication system, wherein a common search space and a user specific search space are multiplexed in a predetermined physical downlink control channel transmitted from the base station, the control channel reception method including:

monitoring, for each predetermined time frame, any one of the common search space and the user specific search space in the predetermined physical downlink control channel in order to obtain downlink control information.

Effect of the Present Invention

According to an embodiment of the present invention, it becomes possible that even a user apparatus in which a bandwidth is restricted properly obtains downlink control information in a case where a plurality of search spaces are multiplexed in a predetermined physical downlink control channel.

EMBODIMENTS FOR CARRYING OUT THE INVENTION

In the following, an embodiment of the present invention is described with reference to figures. The embodiment described below is merely an example, and the embodiment to which the present invention is applied is not limited to the embodiment below. Although the present embodiment is intended for a mobile communication system of LTE, the present invention is not limited to LTE, and can be also applied to other mobile communication systems. In the specification and the claims, the term "LTE" is used to mean 3GPP release 12 or a scheme after release 12 unless specifically noted. Also, the user apparatus UE used in the present embodiment is assumed to be an LC MTC UE in which the bandwidth is restricted. However, the technique described in the present embodiment can be applied not only to the LC MTC UE but also to general UEs. Also, in the present embodiment, a case is shown, as an example, in which a USS and a CSS are multiplexed in a frequency direction. However, the present invention can be also applied to a case where the USS and the CSS are multiplexed in a time direction.

(System Whole Configuration, Operation Outline)

Figure 1:
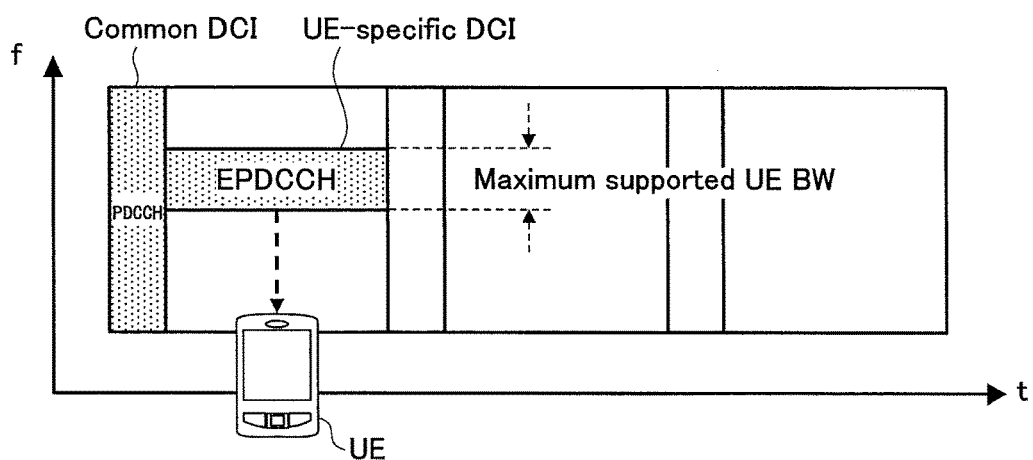
FIG. 1 is a diagram for explaining a bandwidth restriction in LC-MTC.
Figure 2A:
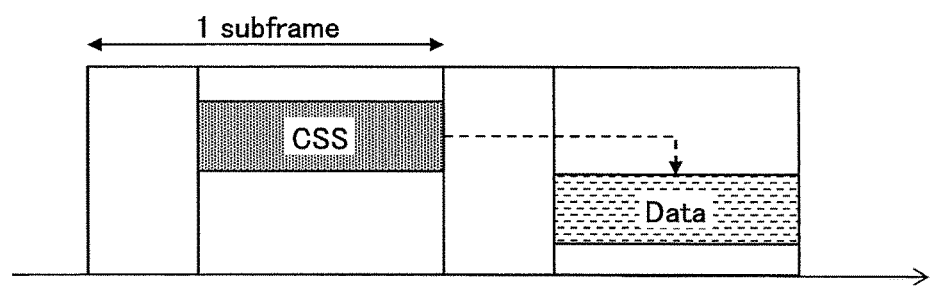
FIG. 2A is a diagram for explaining placement of a CSS and a USS.
Figure 2B:
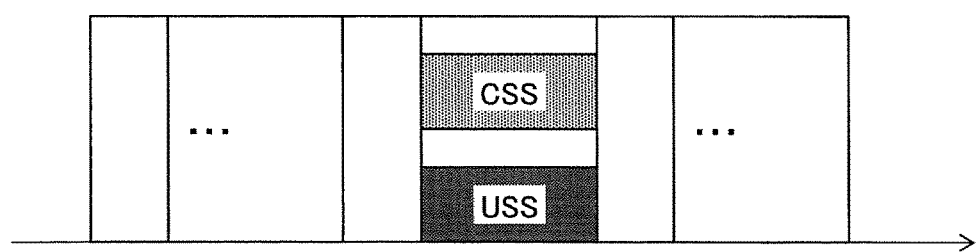
FIG. 2B is a diagram for explaining placement of a CSS and a USS.
Figure 3:
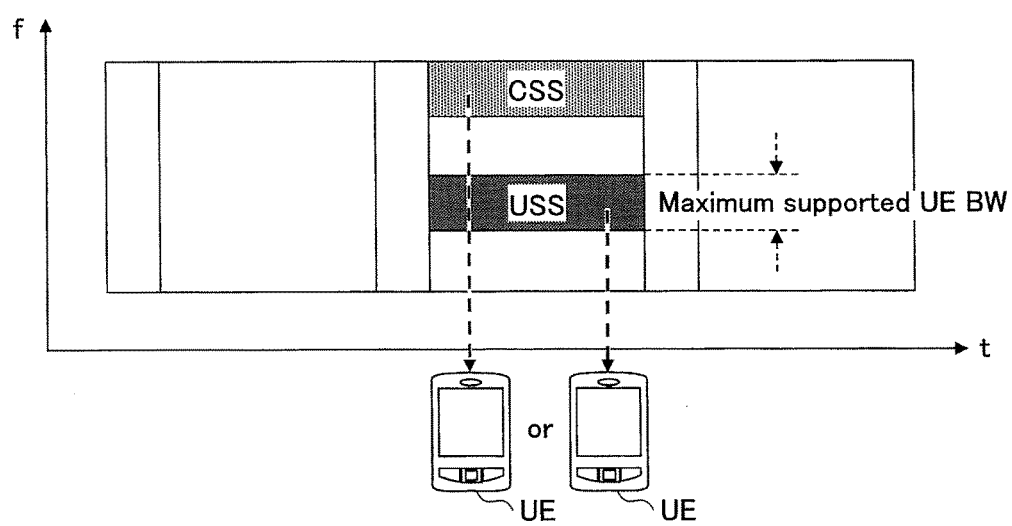
FIG. 3 is a diagram for explaining a problem.
Figure 4:
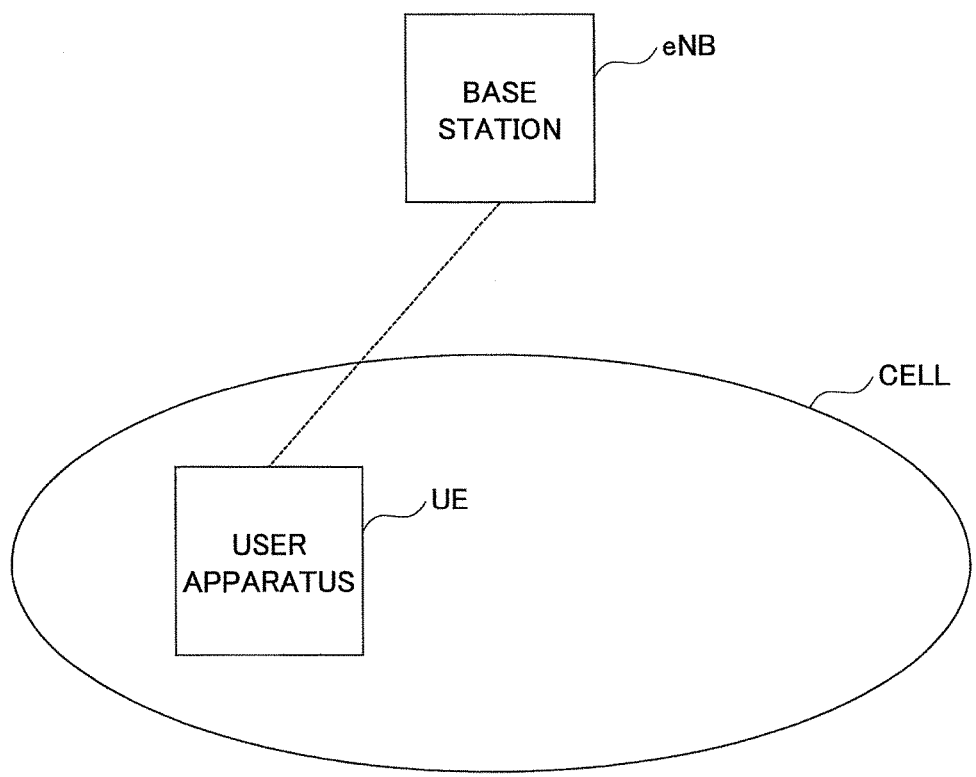
FIG. 4 is a block diagram of a communication system of an embodiment of the present invention.

FIG. 4 shows a block diagram of a communication system in an embodiment of the present invention. As shown in FIG. 4, the communication system of the present embodiment includes a base station eNB forming a cell and a user apparatus UE that resides in the cell and that performs radio communication with the base station eNB. FIG. 4 shows one base station eNB and one user apparatus UE. However, these are representatives, and a plurality of base stations eNB and a plurality of user apparatuses UE may be provided. The communication system can perform at least operation complying with LTE. For example, the user apparatus UE and the base station eNB perform communication using PHY, MAC, RLC, PDCP and RRC and the like as radio interface protocols.

Figure 5:
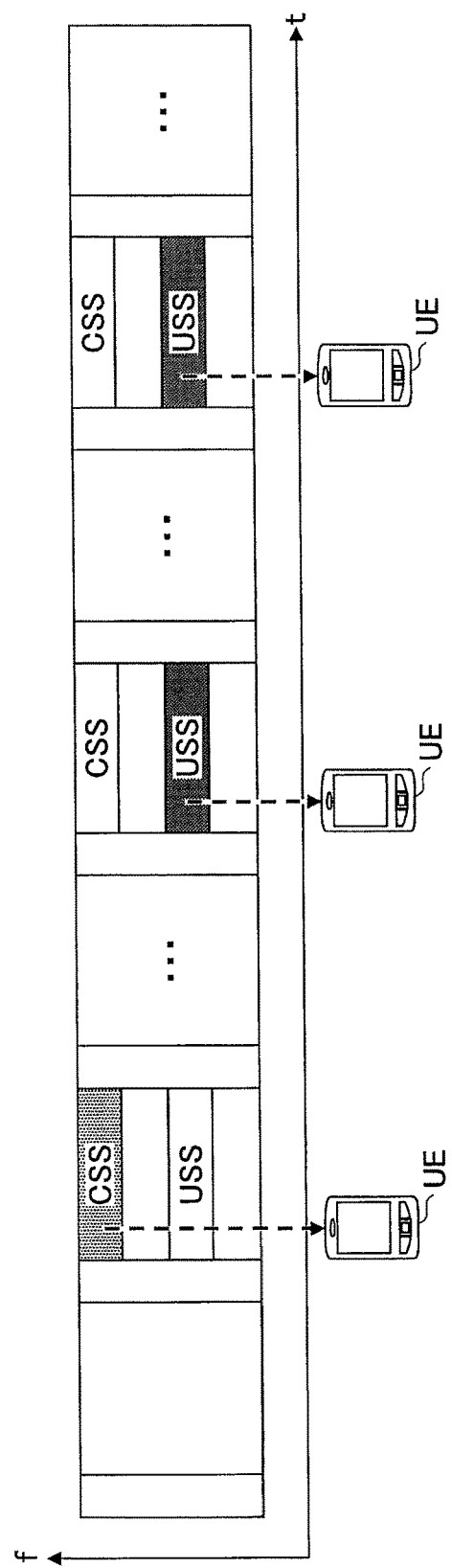
FIG. 5 is a diagram for explaining an outline of the present embodiment.

As shown in FIG. 5, in the present embodiment, the base station eNB transmits a CSS and a USS by an EPDCCH by multiplexing the CSS and the USS in the frequency direction. The user apparatus UE receives only one of a signal of the CSS and a signal of the USS in each subframe due to bandwidth restriction, demodulates it and tries blind decoding of it. Hereinafter, to receive a signal of CSS/USS, demodulate it and try blind decoding is called "monitor". Also, a "subframe" is an example of "predetermined time frame" which is a unit in which CSS/USS is transmitted.

In the following, as a concrete monitoring method example, an example 1~an example 3 are described. In each example, since SIB1, SIB2, paging and RAR are presented, general matters on transmission methods on these signals are described first. Here, in the present embodiment, as examples of system information, although SIB1 and SIB2 are used, SIB2 is an example of a SIB after SIB1, and any SIB after SIB3 can be also monitored similarly to SIB2.

Figure 6:
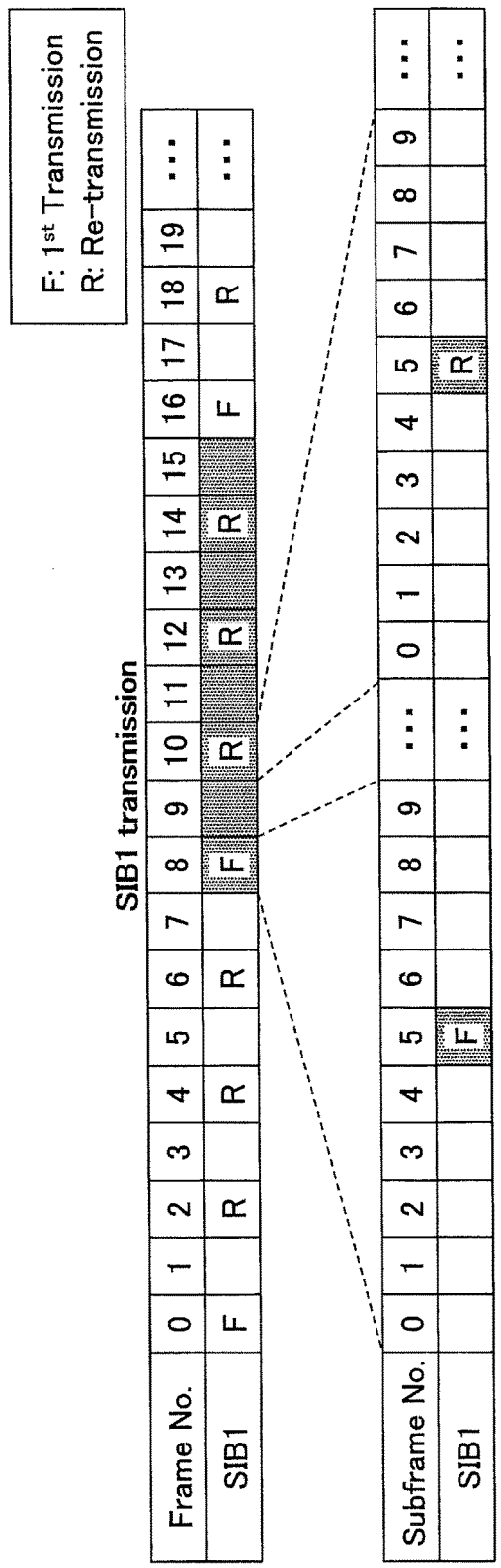
FIG. 6 is a diagram showing a SIB1 transmission example.

SIB1 is system information for notifying of time scheduling information and the like of SIBs on or after SIB2. As shown in FIG. 6, the SIB1 is transmitted with a predetermined period, and a plurality of retransmissions are performed in a period.

Figure 7:
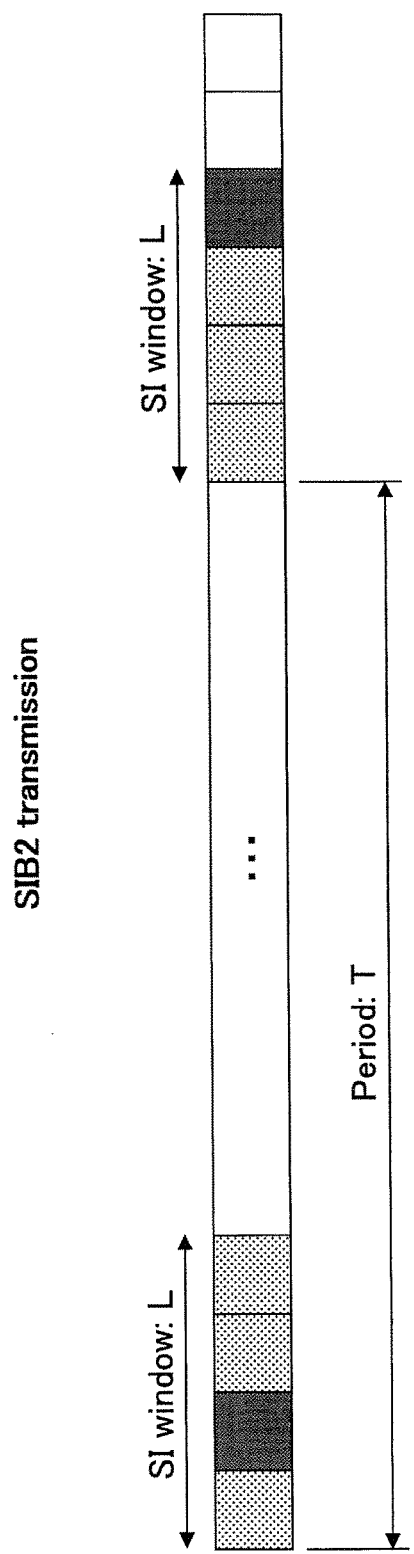
FIG. 7 is a diagram showing a SIB2 transmission example.

SIB2 is system information for notifying of radio resource configuration and the like, and as shown in FIG. 7, the SIB2 is transmitted by a subframe in a window of a predetermined length that periodically arrives. The period and the window length are specified by the SIB1.

Figure 8:
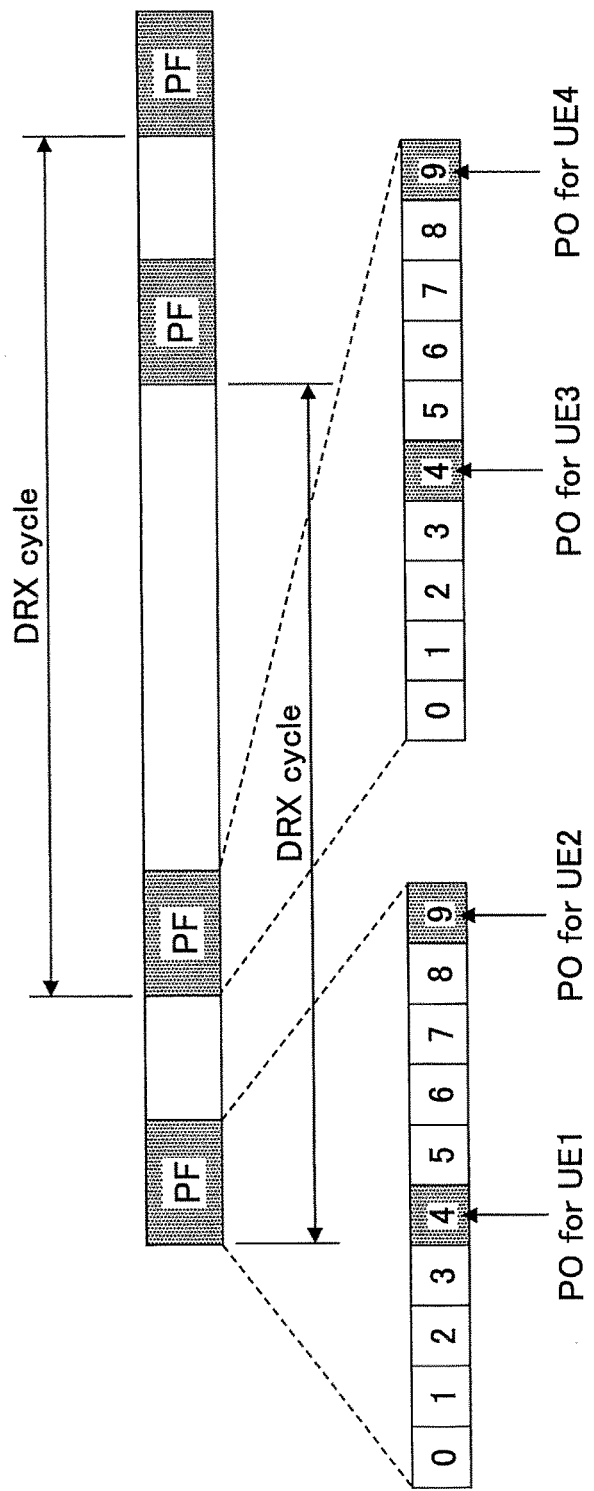
FIG. 8 is a diagram showing a paging transmission example.

As shown in FIG. 8, paging is transmitted (when there is paging information) at a timing of a frame number (paging frame) and a subframe number (paging occasion) in the frame that are calculated from a UE-ID and the like of the UE.

Figure 9:
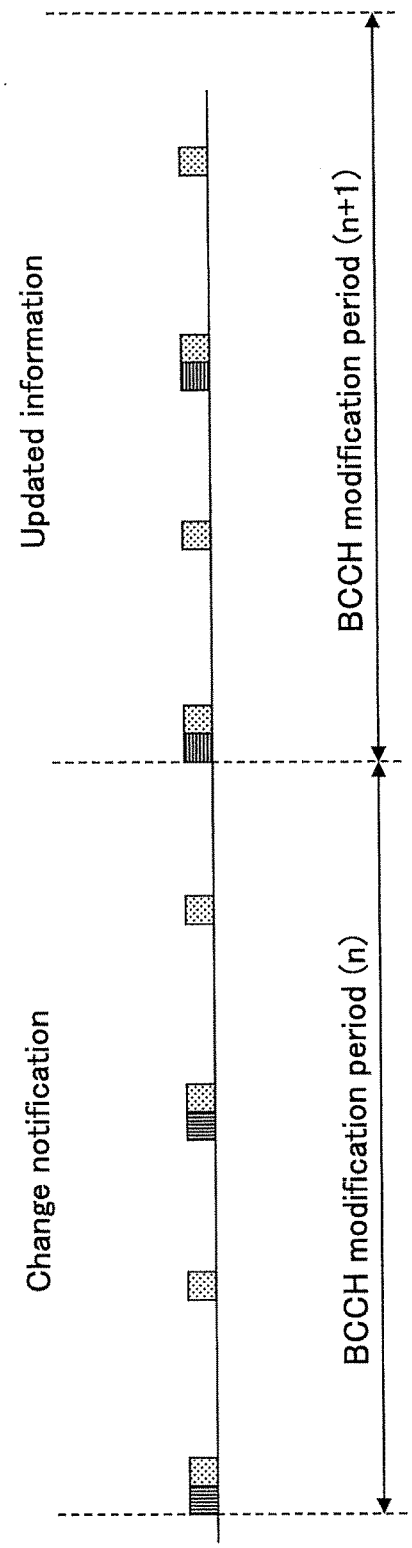
FIG. 9 is a diagram showing BCCH modification period.

As shown in FIG. 9, the system information can be changed in units of BCCH modification periods (BCCH modification periods), and notification of change is performed by a paging that includes systemInfoModification.

RAR (random access response) is a response returned from the base station eNB after the user apparatus UE transmits a random access preamble to the base station eNB, and is transmitted by a subframe in a predetermined time window (RAR window) after the preamble transmission.

Example 1

First, a monitoring method of the user apparatus UE in the example 1 is described. In the example 1, the user apparatus UE monitors a CSS in subframes mentioned below. Note that, in examples 1-3, basically, SIB1 and SIB2 are transmitted by PDCCH based scheduling. That is, it is necessary to receive a DCI for receiving the SIB1 and the SIB2. In the following, for the sake of convenience of explanation, although names such as SIB1, SIB2 and the like are used, they are not necessarily SIBs used in Rel-12, and they may be newly defined system information.

- Monitors, in each BCCH modification period, a CSS in subframes of all paging occasions (PO) where a DCI of paging is possibly received;
- Monitors a CSS in all subframes of an RAR window when it is necessary to receive a DCI of RAR after the user apparatus transmits a RACH preamble and the like;
- After receiving a paging for notifying of change of system information, monitors a CSS of a subframe in which a DCI of SIB1 is initially transmitted, and a CSS of all subframes in a SIB2 window in which a DCI of SIB2 is initially transmitted.

Figure 10:
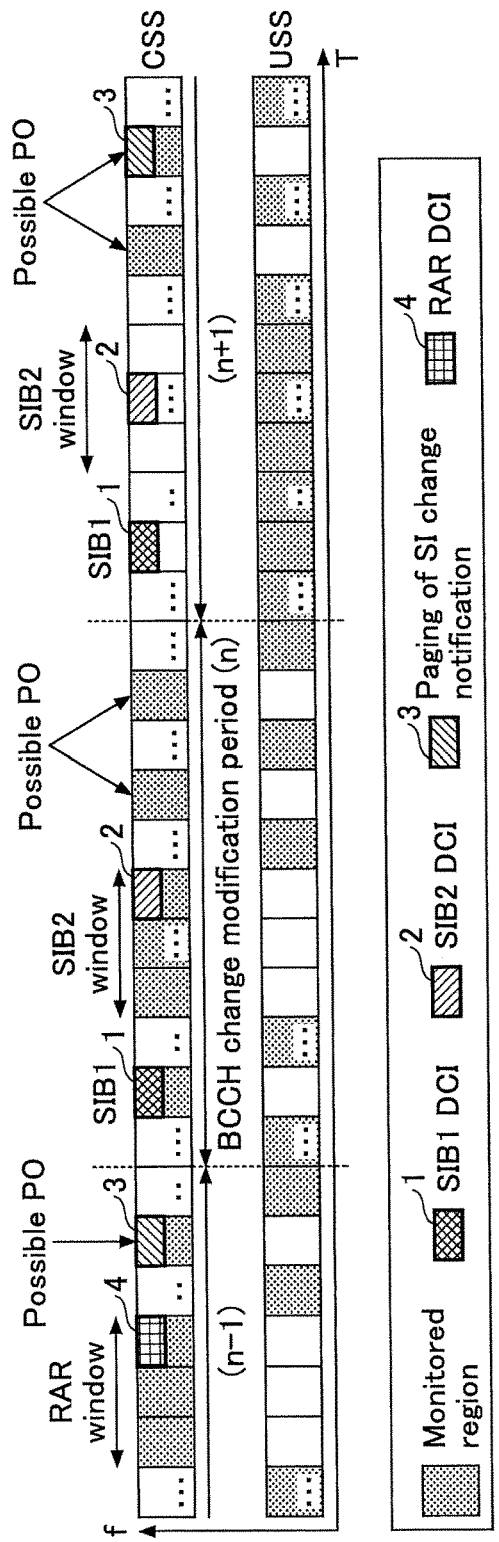
FIG. 10 is a diagram for explaining a monitoring method in an example 1.

FIG. 10 shows an example of the CSS and the USS that the user apparatus UE monitors in the example 1. In the following description, transmitting and monitoring RAR, SIB, paging and the like mean transmitting and monitoring a corresponding DCI. Same applies to descriptions of the examples 2 and 3.

In the example shown in FIG. 10, the user apparatus UE monitors a CSS of each subframe of an RAR window to obtain an RAR (addressed to the user apparatus UE itself) (indicated by 4) in the last subframe of the RAR window. Also, at a BCCH modification period (n−1), the user apparatus UE monitors the CSS in subframes of paging occasions to obtain a paging (indicated by 3) indicating system information change in the subframe.

Since the user apparatus UE has obtained the paging at the BCCH modification period (n−1), the user apparatus UE monitors a transmission subframe of SIB1 at the BCCH modification period (n) and obtains a SIB1 (indicated by 1).

Further, the user apparatus UE monitors the CSS of each subframe of the SIB2 window at the BCCH modification period (n) to obtain a SIB2 (indicated by 2) in a subframe. After that, the user apparatus UE monitors the CSS of each subframe where paging is possibly received. However, since the paging is not transmitted in the period, the user apparatus UE does not obtain the paging.

Since the user apparatus UE does not obtain a paging indicating system information change after obtaining the SIB1 and the SIB2, the user apparatus UE does not monitor the CSS of subframes of SIB1 and SIB2 in the next BCCH modification period (n+1).

Note that SIB1, SIB2, paging indicating system information change and the like are examples of a common signal in a cell.

As shown in the USS (lower side) of FIG. 10, the user apparatus UE monitors the USS in a subframe in which the CSS is not monitored. That is, the base station eNB maps a UE specific DCI, which is to be mapped to the USS, to the USS in a subframe in which the user apparatus UE does not monitor the CSS, and transmits the DCI.

According to the monitoring method of the CSS and the USS of the EPDCCH in the example 1 shown in FIG. 10 as an example, even though the user apparatus UE cannot monitor the CSS and the USS simultaneously, the user apparatus UE can properly obtain DCIs mapped to the CSS and the USS. Also, in the case where the CSS and the USS are time division multiplexed, there is an effect that the search space to be monitored in the same subframe is restricted, so that there is an effect that implementation of the terminal becomes simple. However, as described hereinafter, there is an inefficient point in the monitoring method of the example 1.

Figure 11:
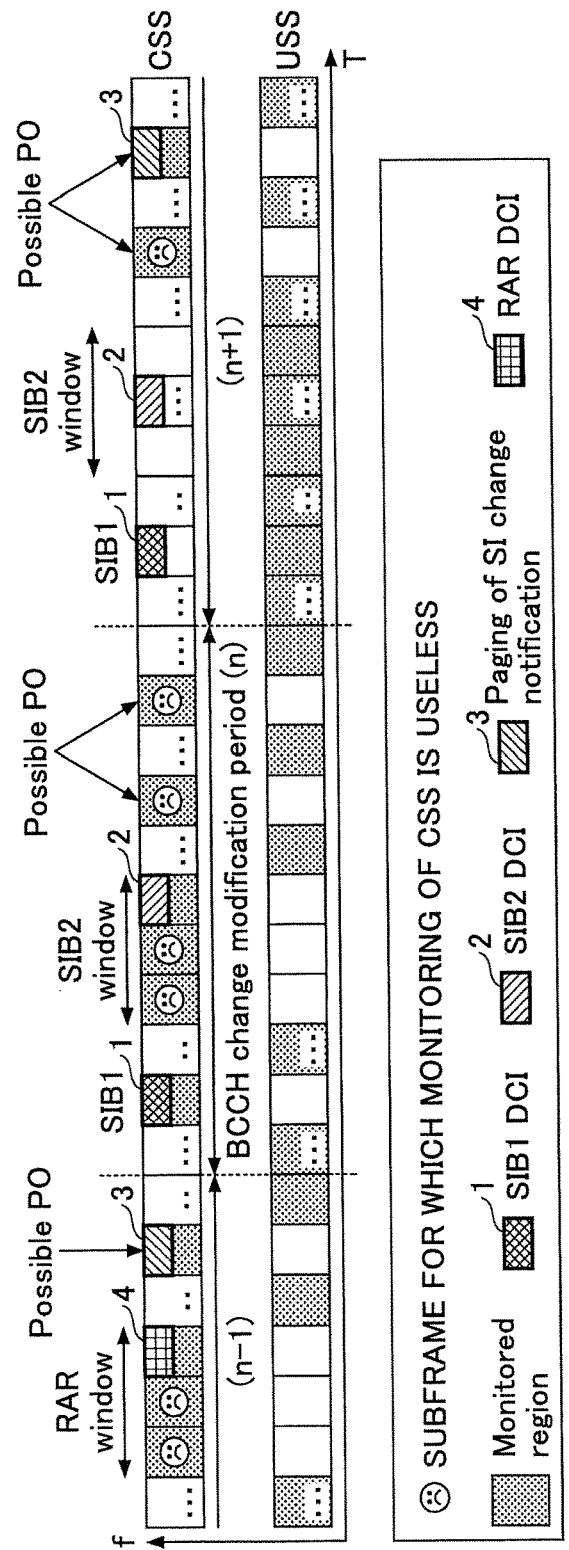
FIG. 11 is a diagram for explaining a monitoring method in an example 1.

That is, although paging information is not transmitted in all paging occasions calculated by a predetermined calculation method, the CSS is monitored in all paging occasions in the example 1. More specifically, as shown in FIG. 11, subframes (marked) in which monitoring of the CSS is useless occur in a plurality of paging occasions.

Also, although an RAR is transmitted by one subframe in an RAR window, CSS of all subframes in an RAR window is monitored in the example 1. More specifically, as shown in FIG. 11, subframes (marked) in which monitoring of the CSS is useless occur in RAR windows.

Also, although the SIB2 is assumed to be transmitted by one subframe in a SIB2 window, CSS is monitored in all subframes of the SIB2 window in the example 1. More specifically, as shown in FIG. 11, subframes (marked) in which monitoring of the CSS is useless occur in SIB2 windows.

Therefore, in a frequency region used for the CSS, a subframe in which the CSS is not transmitted may be used for a USS. Similarly, a subframe that is not monitored by the UE for receiving the CSS in a frequency region used for the USS may be used for CSS. USS for other UEs.

In the following, an example 2 and an example 3 for improving the above-mentioned inefficient points are described.

Example 2

First, an example 2 is described. In the example 2, for a user apparatus UE in an RRC_CONNECTED state (or RRC_IDLE state), one or a plurality of paging occasion (subframe) (s) are defined in a BCCH modification period, so that, when the base station eNB transmits a paging, the base station eNB transmits the paging using a CSS of a subframe of a position (timing) that is defined as the paging occasion in the BCCH modification period.

Also, for a user apparatus UE in an RRC_CONNECTED state (or RRC_IDLE state), one or a plurality of subframes for RAR transmission are defined in an RAR window. When the base station eNB transmits an RAR to a user apparatus UE, the base station eNB transmits the RAR in a CSS of the subframe in the RAR window.

Also, one or a plurality of subframe(s) for SIB2 transmission are defined in a first SIB2 window after system information change. The base station eNB transmits a SIB2 by using a CSS of the defined subframe.

Figure 12:
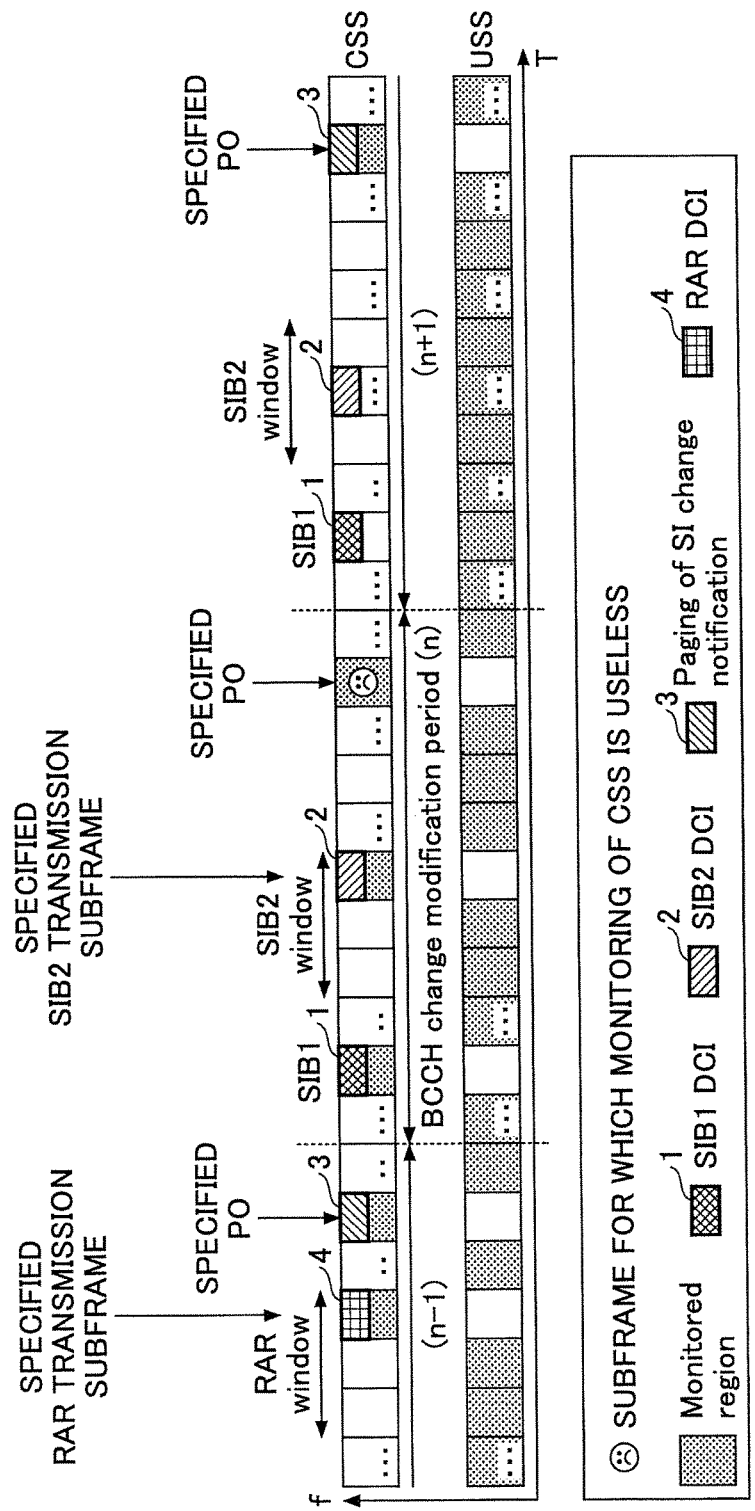
FIG. 12 is a diagram for explaining a monitoring method in an example 2.

FIG. 12 shows CSS/USS that the user apparatus UE monitors in the case where the above-mentioned definition is made. As shown in FIG. 12, as to paging, the user apparatus UE monitors, in each BCCH modification period, only a CSS of a subframe specified as a paging occasion in which a paging may be transmitted.

Also, as to RAR, the user apparatus UE monitors only a CSS of a subframe specified as a subframe in which an RAR is transmitted in an RAR window.

Also, as to SIB2, the user apparatus UE monitors only a CSS of a subframe specified as a subframe in which a SIB2 is transmitted in a first SIB2 window in a BCCH modification period after receiving a system information change paging.

As to a subframe position (timing) for each of the above-mentioned definitions, for example, the base station eNB and the user apparatus UE can ascertain it by using the same rule. As an example, as to paging, the last paging occasion in a plurality of paging occasions in the BCCH modification period calculated by the predetermined calculation method is determined to be a subframe to transmit (monitor) a paging.

As to the RAR, for example, a first subframe in an RAR window can be determined to be a subframe for transmitting (monitoring) an RAR. Also, as to SIB2, a first subframe in an SIB2 window can be determined to be a subframe for transmitting SIB2.

Also, positions of subframes of each definition may be specified (configured) in the base station eNB, so that the base station eNB may notify the user apparatus UE of information on the specified positions by broadcast information (example: a spare bit of MIB (Master Information Block), new field of SIB1, and the like), or by RRC signaling. The user apparatus UE can monitor the CSS efficiently according to the notified information.

According to the example 2, as shown in FIG. 12, CSS to monitor by the user apparatus UE is reduced, so that USS can be monitored in more subframes.

Example 3

Next, an example 3 is described. In the example 3, the base station eNB transmits a signal, transmitted by a CSS in the examples 1 and 2, also by a USS.

Figure 13:
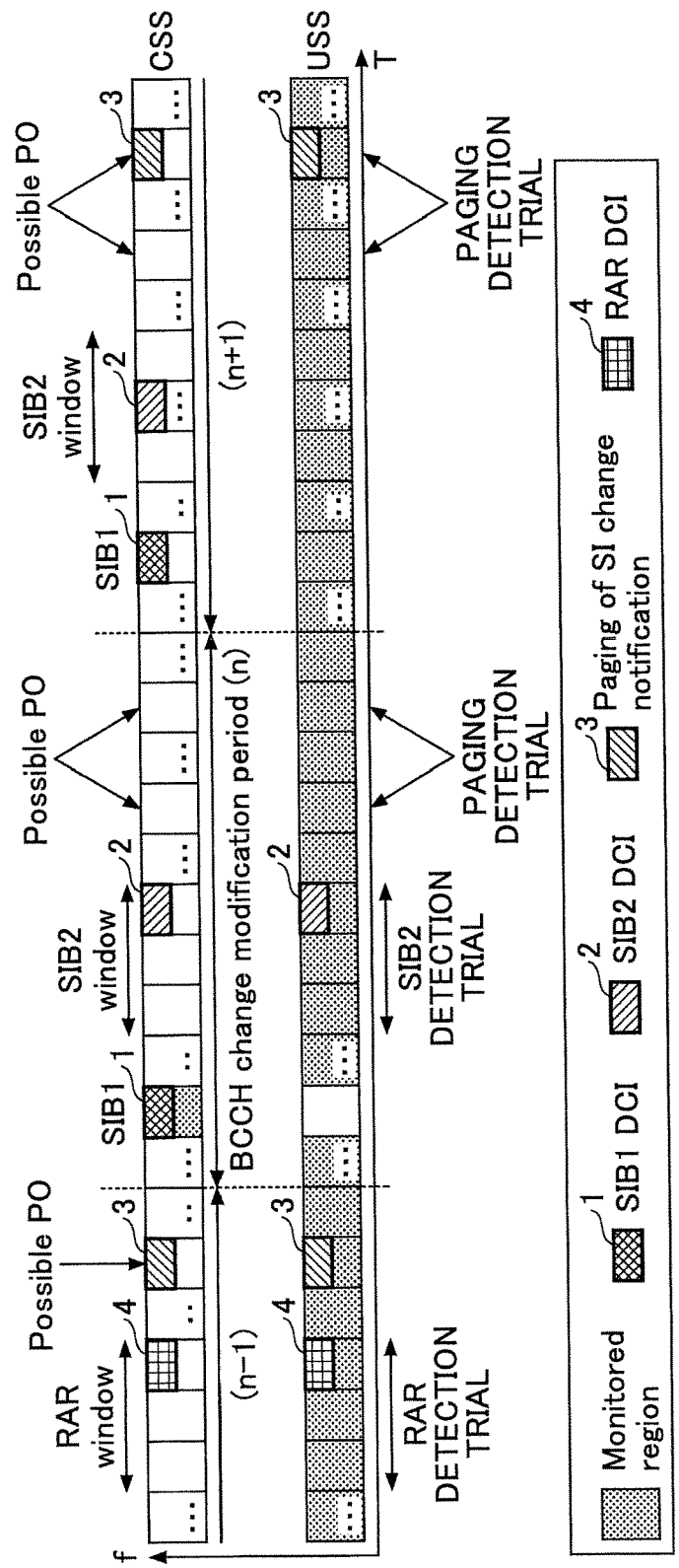
FIG. 13 is a diagram for explaining a monitoring method in an example 3.

More specifically, as shown in FIG. 13, the base station eNB transmits a paging for system information change by a USS. As shown in FIG. 13, the user apparatus UE monitors a USS in a subframe of a paging occasion in which the paging may be transmitted so as to try detection of the paging. Note that, in the example of FIG. 13, other than predetermined timing of SIB1, USS is continuously monitored. Monitoring a paging is to perform blind decoding using an RNTI for obtaining a paging while monitoring the USS continuously. Same applies to RAR and SIB. Also, when monitoring the USS without being aware of types of signals to monitor, monitoring may be performed by using RNTIs corresponding to every signal that can be monitored.

Also, the base station eNB transmits an RAR by the USS. As shown in FIG. 13, the user apparatus UE monitors the USS in a subframe of an RAR window to try detection of an RAR.

Also, the base station eNB transmits a SIB2 by the USS. As shown in FIG. 13, the user apparatus UE monitors the USS in a subframe of a SIB2 window to try detection of a SIB2.

In the example 3, as a timing for transmitting paging/RAR/SIB2, it may be transmitted in a range of a predetermined window like the example 1, or, by applying the method of the example 2, it may be transmitted (monitored) by specifying a timing of narrower time range.

In the USS, the user apparatus UE performs blind decoding of a DCI using C-RNTI, SPS-RNTI, P-RNTI, SI-RNTI and RA-RNTI, for example. All of these may be used in the USS of each subframe, or, monitoring may be performed by using only an RNTI corresponding to a signal that may be transmitted from the base station eNB by the subframe.

In the example 3, when the base station eNB transmits paging/RAR/SIB2 using the USS, the base station eNB transmits it using the USS in addition to transmitting it by the CSS. However, it is not limited to this.

Figure 14:
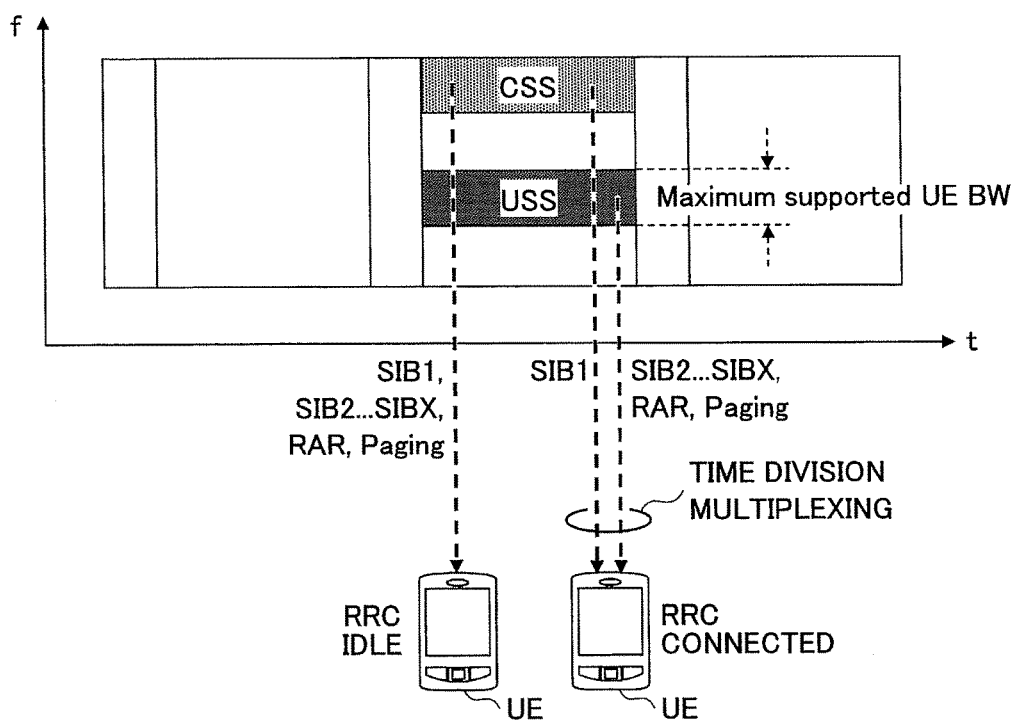
FIG. 14 is a diagram showing a switch example of reception operation by RRC states.

In the example 3, when the user apparatus UE ascertains that a USS is assigned to the user apparatus UE itself (when ascertaining a position of the USS by an RRC signaling or other signals (Mac signal, system information and the like) received from the base station eNB, the user apparatus UE may always monitor paging/RAR/SIB2 by the USS, or the user apparatus UE may switch between monitoring by CSS and monitoring by USS according to RRC states as shown in FIG. 14.

In the example of FIG. 14, the user apparatus UE monitors paging/RAR/SIB by using a CSS in an RRC_IDLE state, and the user apparatus UE monitors other than SIB1 by using a USS in an RRC_CONNECTED state. Since there is a possibility in that a DCI of a data signal addressed to the user apparatus UE is transmitted from the base station eNB by the USS in the RRC_CONNECTED state, efficient data reception can be performed by monitoring the USS in the RRC_CONNECTED state.

Also, the user apparatus UE may switch search space (between USS and CSS) for monitoring an RAR based on a random access preamble transmitted in random access.

For example, the base station eNB and the user apparatus UE may hold a table in which (a value or a group of) random access preamble is associated with a search space for transmitting and receiving an RAR, so that the base station eNB may select a search space for transmitting an RAR based on the random access preamble received from the user apparatus UE to transmit an RAR using the selected search space, and the user apparatus UE may monitor a search space corresponding to the transmitted random access preamble.

Also, the base station eNB may switch an RNTI used for masking CRC between CSS and USS. For example, when performing transmission using the USS in an RRC_CONNECTED state, C-RNTI may be used, like data transmission, for SIB (other than SIB1), RAR and paging. Also, in this case, a new RNTI may be used. When the C-RNTI is used for SIB (other than SIB1), RAR and paging, the user apparatus UE can obtain these by the C-RNTI.

Figure 15:
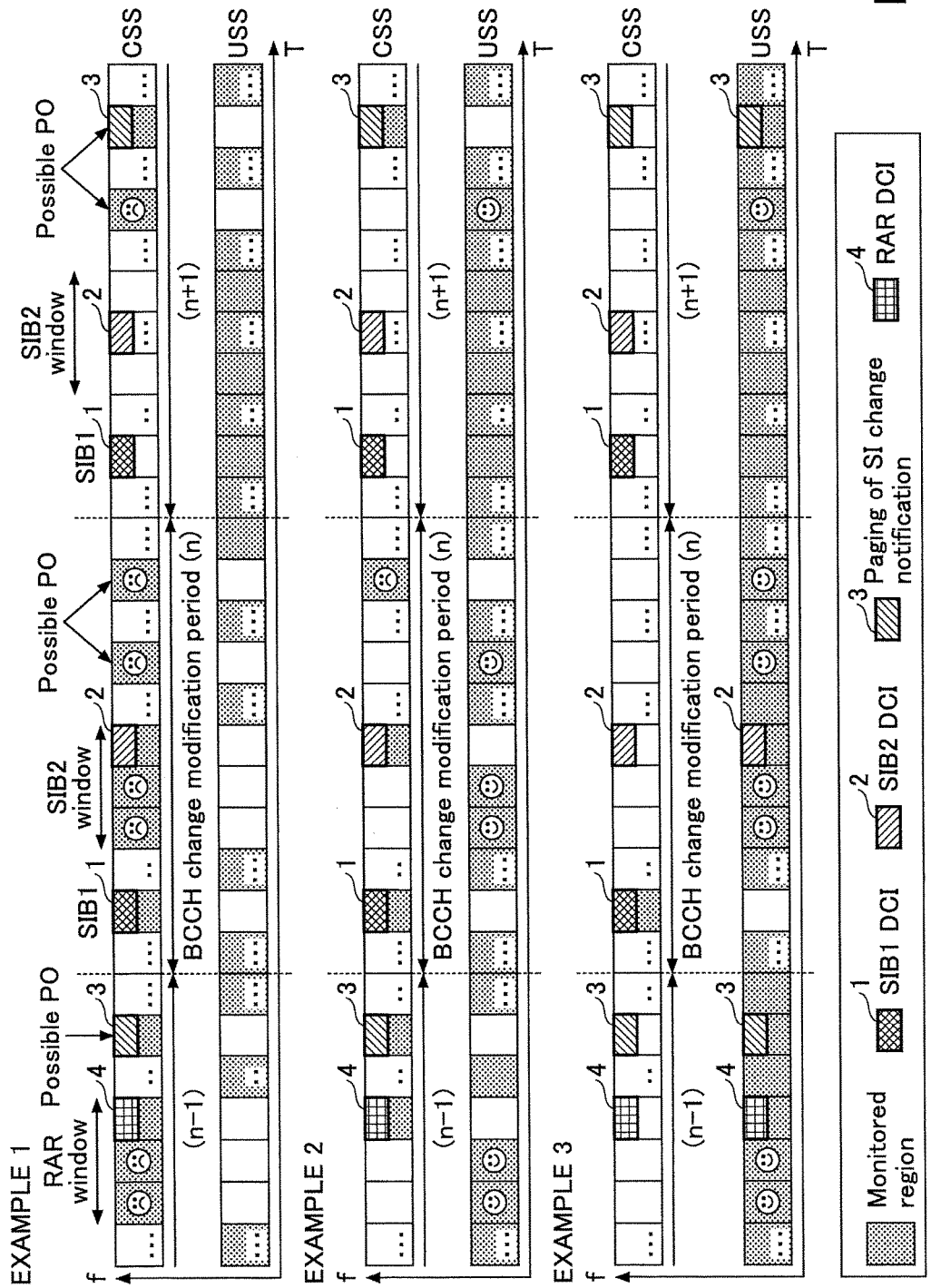
FIG. 15 is a diagram collectively showing monitoring methods of examples 1-3.

FIG. 15 shows compiled monitoring methods of examples 1-3. As shown in FIG. 15, time period during which USS can be monitored increases in an order of examples 1, 2 and 3, so that it can be considered that data for UE can be obtained efficiently in this order.

Although SIB is made to be a scheduling target of a DCI in the examples 1-3, a fixed resource may be assigned to SIB. For example, a transmission resource of a SIB may be predetermined as a relative position (frequency • time position) with respect to MIB or PSS/SSS, or resources for SIBs on or after SIB2 and RNTIs for monitoring them may be notified using SIB1. By using fixed resource assignment for SIB, it becomes unnecessary to monitor the SIB by the CSS, so that a time period during which USS can be monitored can be increased.

Although figures of the examples 1-3 show examples in which CSS•USS are assigned one by one, a plurality of USSes may be assigned since the USS can be assigned for each UE terminal. Also, when applying Coverage Enhancement, CSS•USS of different frequencies may be assigned to different Coverage Enhancements respectively. By specifying different search spaces according to Coverage Enhancement Levels, resource collision due to Repetition transmission applied in Coverage Enhancement can be avoided.

Also, the technique of the example 1, the technique of the example 2, and the technique of the example 3 can be arbitrarily combined and executed unless contradiction occurs.

(Apparatus Configuration Example)

In the following, configuration examples of the user apparatus UE and the base station eNB in the present embodiment (including examples 1-3) are shown.

<User Apparatus>

Figure 16:
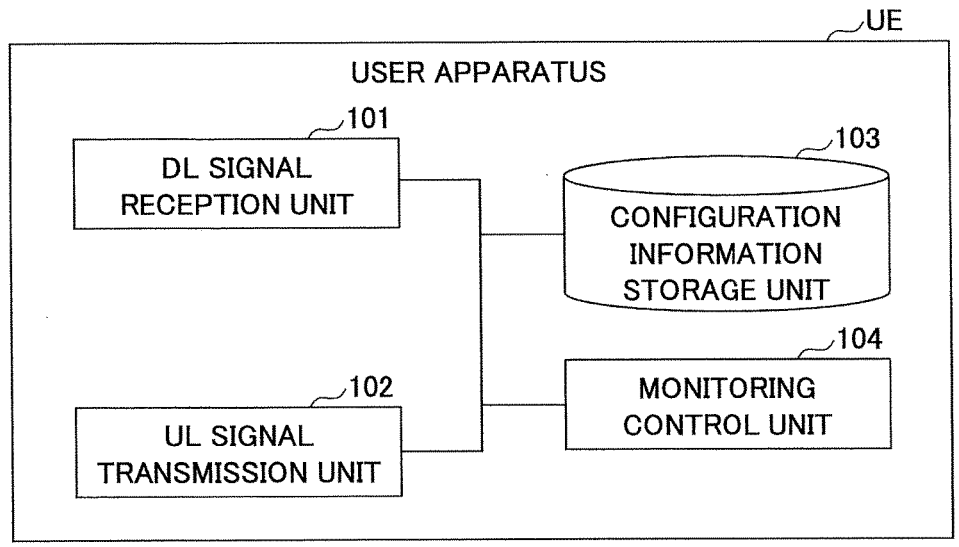
FIG. 16 is a block diagram of a user apparatus UE.

FIG. 16 shows a functional block diagram of the user apparatus UE in an embodiment of the present invention. As shown in FIG. 16, the user apparatus UE of the present embodiment includes a DL signal reception unit 101, an UL signal transmission unit 102, a configuration information storage unit 103 and a monitoring control unit 104. FIG. 16 only shows functional units especially related to the embodiment of the present invention in the user apparatus UE, and the user apparatus UE also includes at least functions, not shown in the figure, for performing operation complying with LTE. Also, the configuration shown in FIG. 16 is merely an example, and, any functional segmentations and any names of functional units can be used as long as the user apparatus UE can execute processing described in the present embodiment.

The DL signal reception unit 101 receives a radio signal from the base station eNB, and extracts information from the radio signal. The UL signal transmission unit 102 generates a radio signal from transmission information to transit the radio signal to the base station eNB.

The configuration information storage unit 103 stores various pieces of configuration information notified from the base station eNB by system information, MAC signal, RRC signaling and the like, and stores information of definitions in the example 2. The information of definitions is, for example, information such as, as to RAR, monitoring by a last/first subframe of an RAR window. The monitoring control unit 104 includes a function configured to monitor paging/RAR/SIB by a monitoring method of any one of or a combination of the examples 1-3. More specifically, for example, the monitoring control unit 104 instructs a monitoring method to the DL signal reception unit 101 to cause the DL signal reception unit 101 to perform monitoring of USS/CSS.

<Base Station eNB>

Figure 17:
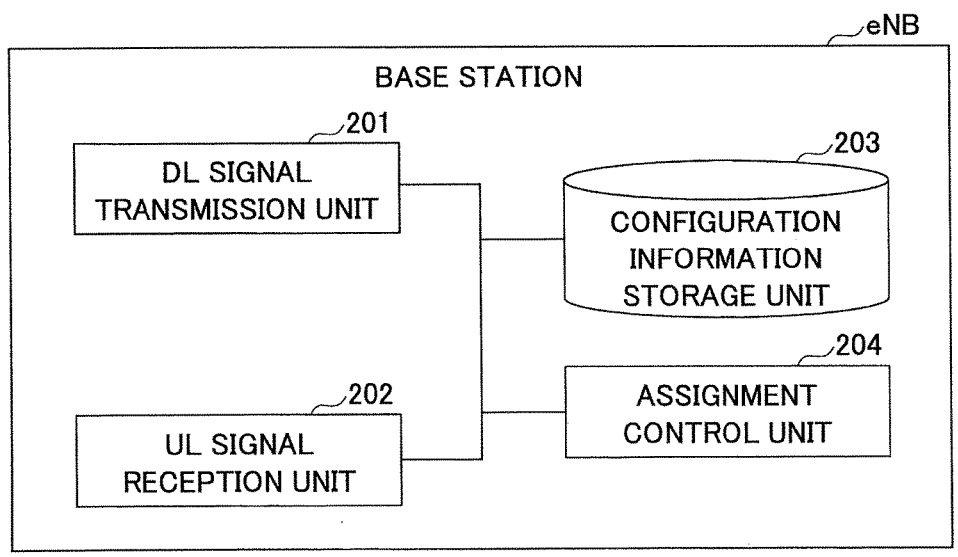
FIG. 17 is a block diagram of a base station eNB.

FIG. 17 shows a functional block diagram of the base station eNB in an embodiment of the present invention. As shown in FIG. 17, the base station eNB of the present embodiment includes a DL signal transmission unit 201, an UL signal reception unit 202, a configuration information storage unit 203 and an assignment control unit 204. FIG. 17 only shows functional units especially related to the embodiment of the present invention in the base station eNB, and the base station eNB also includes at least functions, not shown in the figure, for performing operation complying with LTE. Also, the configuration shown in FIG. 17 is merely an example, and, any functional segmentations and any names of functional units can be used as long as the base station eNB can execute processing described in the present embodiment.

The DL signal transmission unit 201 generates a radio signal from transmission information to transit the radio signal to the user apparatus UE. The UL signal reception unit 202 receives a radio signal from the user apparatus UE, and extracts information from the radio signal.

The configuration information storage unit 203 stores various pieces of configuration information notified from the user apparatus UE by an RRC message, an MAC signal, and the like, and stores information of definitions in the example 2. The information of definitions is, for example, information such as, as to RAR, monitoring by a last/first subframe of an RAR window. The assignment control unit 204 includes a function configured to perform resource assignment in the base station eNB side corresponding to monitoring method(s) of any one of or a combination of the examples 1-3.

As described above, according to the present embodiment, there is provided a user apparatus configured to perform communication with a base station in a mobile communication system, wherein a common search space and a user specific search space are multiplexed in a predetermined physical downlink control channel transmitted from the base station, the user apparatus including:

a monitoring control unit configured to monitor, for each predetermined time frame, any one of the common search space and the user specific search space in the predetermined physical downlink control channel in order to obtain downlink control information.

According to the above configuration, it becomes possible that even a user apparatus in which a bandwidth is restricted properly obtains downlink control information in a case where a plurality of search spaces are multiplexed in a predetermined physical downlink control channel.

For example, the monitoring control unit is configured to monitor the common search space in the predetermined time frame that corresponds to a time range during which downlink control information of a predetermined signal may be transmitted from the base station, and to monitor the user specific search space in a time frame other than the time range. According to this configuration, a time range for monitoring the common search space can be restricted.

The monitoring control unit may be configured to specify a narrow time range narrower than the time range based on a predetermined rule or information received from the base station to monitor the common search space in the predetermined time frame corresponding to the narrow time range, and to monitor the user specific search space in a time frame other than the narrow time range. According to this configuration, a time range for monitoring the common search space can be further restricted.

The narrow time range is, for example, a subframe in which downlink control information of a paging is transmitted, a subframe in which downlink control information of system information is transmitted, or a subframe in which downlink control information of a random access response is transmitted. According to this configuration, paging, system information or random access response can be monitored efficiently.

In a case where, in addition to downlink control information of a signal for the user apparatus, downlink control information of a signal common in a cell is transmitted using the user specific search space, for example, the monitoring control unit is configured to monitor the user specific search space in a time frame excluding a specific timing at which downlink control information transmitted by using only the common search space should be received. According to this configuration, since the user specific search space can be monitored in other than a limited part of time frame, a signal for a user apparatus can be monitored efficiently.

The monitoring control unit is configured, for example, to monitor the common search space when the user apparatus is in an RRC idle state, and to monitor the user specific search space in a time frame excluding the specific timing when the user apparatus is in an RRC connected state. According to this configuration, a signal for a user apparatus can be monitored more efficiently.

The predetermined physical downlink control channel is an EPDCCH, for example. According to this configuration, in a case where the user specific search space and the common search space are mapped to the EPDCCH, even a user apparatus in which bandwidth is restricted can properly obtain downlink control information.

The monitoring control unit is configured, for example, to receive a signal of the common search space or the user specific search space, and to perform blind decoding by using an RNTI in the received space in order to obtain the downlink control information. According to this configuration, downlink control information masked by an RNTI can be properly obtained.

The user apparatus UE described in the present embodiment may include a CPU and a memory and may be realized by executing a program by the CPU (processor), or may be realized by hardware such as hardware circuits including logics of processing described in the present embodiment, or may be configured by coexistence of a program and hardware.

The base station eNB described in the present embodiment may include a CPU and a memory and may be realized by executing a program by the CPU (processor), or may be realized by hardware such as hardware circuits including logics of processing described in the present embodiment, or may be configured by coexistence of a program and hardware.

In the above, the embodiments of the present invention have been explained. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the base station eNB and the user apparatus UE have been explained by using functional block diagrams. However, such apparatuses may be implemented in hardware, software, or a combination thereof.

Each of the software that operates by a processor provided in the user apparatus UE according to an embodiment of the present invention, and the software that operates by a processor provided in the base station eNB may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present patent application claims priority based on Japanese patent application No. 2014-195884, filed in the JPO on Sep. 25, 2014, and the entire contents of the Japanese patent application No. 2014-195884 are incorporated herein by reference.

DESCRIPTION OF REFERENCE SIGNS eNB base station
UE user apparatus
101 DL signal reception unit
102 UL signal transmission unit
103 configuration information storage unit
104 monitoring control unit
201 DL signal transmission unit
202 UL signal reception unit
203 configuration information storage unit
204 assignment control unit

The invention claimed is:

1. A user apparatus configured to perform communication with a base station in a mobile communication system,
   wherein a common search space and a user specific search space are defined in a predetermined physical downlink control channel transmitted from the base station, the user apparatus comprising:
   a monitoring control unit configured to monitor, for each predetermined time frame, any one of the common search space and the user specific search space in the predetermined physical downlink control channel,
   wherein the user apparatus is a bandwidth reduced user apparatus, and
   wherein the monitoring control unit is configured to monitor the common search space in the predetermined time frame that corresponds to a subframe in which downlink control information of a random access response is transmitted.

2. The user apparatus as claimed in claim 1, wherein the monitoring control unit is configured to specify a narrow time range narrower than the time range based on a predetermined rule or information received from the base station to monitor the common search space in the predetermined time frame corresponding to the narrow time range, and to monitor the user specific search space in a time frame other than the narrow time range.

3. The user apparatus as claimed in claim 2, wherein, in a case where, in addition to downlink control information of a signal for the user apparatus, downlink control information of a signal common in a cell is transmitted using the user specific search space,
   the monitoring control unit is configured to monitor the user specific search space in a time frame excluding a specific timing at which downlink control information transmitted by using only the common search space should be received.

4. The user apparatus as claimed in claim 2, wherein the predetermined physical downlink control channel is an EPDCCH.

5. The user apparatus as claimed in claim 2, wherein the monitoring control unit is configured to receive a signal of the common search space or the user specific search space, and to perform blind decoding by using an RNTI in the received space in order to obtain the downlink control information.

6. The user apparatus as claimed in claim 1, wherein, in a case where, in addition to downlink control information of a signal for the user apparatus, downlink control information of a signal common in a cell is transmitted using the user specific search space,
   the monitoring control unit is configured to monitor the user specific search space in a time frame excluding a specific timing at which downlink control information transmitted by using only the common search space should be received.

7. The user apparatus as claimed in claim 6, wherein the monitoring control unit is configured to monitor the common search space when the user apparatus is in an RRC idle state, and to monitor the user specific search space in a time frame excluding the specific timing when the user apparatus is in an RRC connected state.

8. The user apparatus as claimed in claim 1, wherein the predetermined physical downlink control channel is an EPDCCH.

9. The user apparatus as claimed in claim 1, wherein the monitoring control unit is configured to receive a signal of the common search space or the user specific search space, and to perform blind decoding by using an RNTI in the received space in order to obtain the downlink control information.

10. A control channel reception method executed by a user apparatus configured to perform communication with a base station in a mobile communication system,
   wherein a common search space and a user specific search space are defined in a predetermined physical downlink control channel transmitted from the base station, the control channel reception method comprising:
   monitoring, for each predetermined time frame, any one of the common search space and the user specific search space in the predetermined physical downlink control channel,
   wherein the user apparatus is a bandwidth reduced user apparatus, and
   wherein the user apparatus is configured to monitor the common search space in the predetermined time frame that corresponds to a subframe in which downlink control information of a random access response is transmitted.

* * * * *